United States Patent [19]

Wahlers et al.

[11] 4,378,409

[45] Mar. 29, 1983

[54] ELECTRICAL RESISTOR MATERIAL, RESISTOR MADE THEREFROM AND METHOD OF MAKING THE SAME

[75] Inventors: Richard L. Wahlers, Churchville; Kenneth M. Merz, Gladwyne, both of Pa.

[73] Assignee: TRW, Inc., Cleveland, Ohio

[21] Appl. No.: 298,997

[22] Filed: Sep. 3, 1981

Related U.S. Application Data

[63] Continuation of Ser. No. 613,433, Sep. 15, 1975, Pat. No. 4,322,477.

[51] Int. Cl.[3] .......................... B32B 17/06; H01B 1/06

[52] U.S. Cl. .................................... 428/432; 252/518; 252/519; 252/520; 338/308; 427/101; 427/126.2; 427/126.3; 427/376.2; 427/377; 428/427; 428/428; 428/697; 428/701; 428/702

[58] Field of Search ..................... 252/518.1, 519, 520; 338/38; 427/101, 126.2, 376.2, 377, 126.3; 428/427, 428, 697, 701, 702, 432

[56] References Cited

U.S. PATENT DOCUMENTS

| | | | |
|---|---|---|---|
| 2,564,707 | 8/1951 | Mochel | 252/518.1 |
| 2,717,946 | 9/1955 | Peck | 252/518.1 |
| 3,044,901 | 7/1962 | Garnsworthy | 252/518.1 |
| 3,108,019 | 10/1963 | Davis | 338/308 |
| 3,488,767 | 6/1970 | Collins | 338/308 |
| 3,546,015 | 12/1970 | Vulliez | 427/101 |
| 3,669,907 | 6/1972 | Kohashi | 252/518.1 |
| 3,923,698 | 12/1975 | Kamigaito | 252/518.1 |
| 4,061,827 | 3/1976 | Gould | 428/368 |

OTHER PUBLICATIONS

Burkett, R. H. W., "Tin Oxide Resistors," *J. Brit I.R.E.*, Apr. 1961, pp. 301-304.

Dearden, J. "High Value, High Voltage Resistor," *Electronic Components*, Mar. 1967, pp. 259-263.

*Primary Examiner*—Ellis P. Robinson

*Attorney, Agent, or Firm*—Jacob Trachtman

[57] ABSTRACT

A vitreous enamel resistor material comprising a mixture of a vitreous glass frit and fine particles of tin oxide ($SnO_2$). An electrical resistor is made from the resistor material by applying the material to a substrate and firing the coated substrate to a temperature at which the glass melts. The tin oxide is preferably heat treated prior to mixing with the glass frit. Upon cooling, the substrate has on the surface thereof, a film of the glass having the particles of the tin oxide embedded therein and dispersed therethroughout. The resistor material provides a resistor having a wide range of resistivity and a low temperature coefficient of resistance.

21 Claims, 1 Drawing Figure

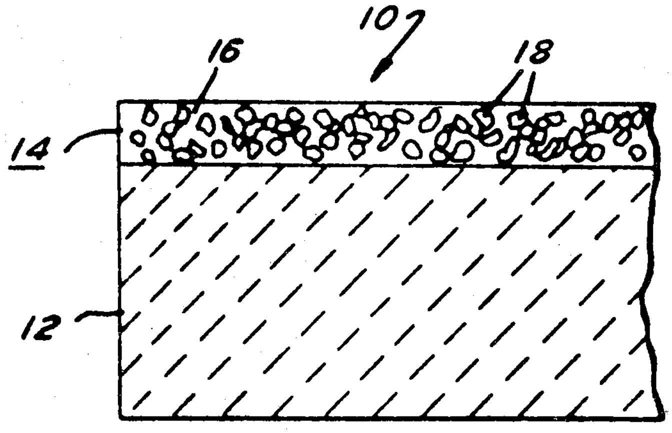
10
16
18
14
12

ELECTRICAL RESISTOR MATERIAL, RESISTOR MADE THEREFROM AND METHOD OF MAKING THE SAME

This application is a continuation of application Ser. No. 613,433, now U.S. Pat. No. 4,322,477 filed Sept. 15, 1975.

The present invention relates to a resistor material, resistors made from the material, and a method of making the material. More particularly, the present invention relates to a vitreous enamel resistor material which provides resistors over a wide range of resistivities and with relatively low temperature coefficients of resistance, and which are made from relatively inexpensive materials.

A type of electrical resistor material which has recently come into commercial use is a vitreous enamel resistor material which comprises a mixture of a glass frit and finely divided particles of an electrical conductive material. The vitreous enamel resistor material is coated on the surface of a substrate of an electrical insulating material, usually a ceramic, and fired to melt the glass frit. When cooled, there is provided a film of glass having the conductive particles dispersed therein.

Since there are requirements for electrical resistors having a wide range of resistance values, it is desirable to have vitreous enamel resistor materials with respective properties which will allow the making of resistors over a wide range of resistance values. However, a problem has arisen with regard to providing a vitreous enamel resistor material which will provide resistors having a high resistivity and which are also relatively stable with changes in temperature, i.e., has a low temperature coefficient of resistance. The resistor materials which provide both wide range of resistivities and low temperature coefficients of resistance generally utilize the noble metals as the conductive particles and are therefore relatively expensive.

Pyrolytically deposited films of tin oxide have been used as a resistor as disclosed by R. H. W. Burkett in "Tin Oxide Resistors" published in the JOURNAL OF THE BRITISH I. R. E., April 1961, pp. 301-304. However, as disclosed by Burkett such tin oxide resistor films were relatively unstable and had a highly negative TCR. The instability of tin oxide resistor films is also disclosed in U.S. Pat. No. 2,564,707 issued to John M. Mochel, on August 21, 1951, entitled "Electrically Conducting Coatings on Glass and Other Ceramic Bodies." Mochel attempted to overcome this instability by doping the tin oxide with other metals. Although, as described in the article by J. Dearden entitled "High Value, High Voltage Resistors," ELECTRONIC COMPONENTS, March 1967, pp. 259-262, tin oxide doped with antimony has been used in a vitreous enamel resistor material, this material has a high negative temperature coefficient of resistance.

It is therefore an object of the present invention to provide a novel resistor material and resistor made therefrom.

It is another object of the present invention to provide a novel vitreous enamel resistor material and a resistor made therefrom.

It is a still further object of the present invention to provide a vitreous enamel resistor material which provides resistors over a wide range of resistivities and with relatively low temperature coefficients of resistance.

It is another object of the present invention to provide a vitreous enamel resistor material which provides a resistor having a high resistivity and a relatively low temperature coefficient of resistance and which is made of a relatively inexpensive material.

Other objects will appear hereinafter.

These objects are achieved by a resistor material comprising a mixture of a glass frit and finely divided particles of tin oxide. The tin oxide is preferably heat treated prior to mixing with the glass frit.

The invention accordingly comprises a composition of matter possessing the characteristics, properties, and the relation of components which are exemplified in the compositions hereinafter described, and the scope of the invention is indicated in the claims.

For a fuller understanding of the nature and objects of the invention, reference should be had to the following detailed description taken in connection with the accompanying drawing in which:

The FIGURE of the drawing is a sectional view of a portion of a resistor made with the resistor material of the present invention.

In general the vitreous enamel resistor material of the present invention comprises a mixture of a vitreous glass frit and fine particles of tin oxide ($SnO_2$). The glass frit is present in the resistor material in the amount of 30% to 80% by volume, and preferably in the amount of 40% to 60% by volume. Based upon the amount of glass frit present in the resistor material, the tin oxide is thus present in the resistor material in the amount of 20% to 70% by volume, and preferably in the amount of 40% to 60% by volume.

The glass frit used must have a softening point below that of the conductive phase. It has been found that the use of a borosilicate frit is preferable, and particularly an alkaline earth borosilicate frit, such as a barium or calcium borosilicate frit. The preparation of such frits is well known and consists, for example, of melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The coarse frit is preferably milled in a ball mill with water to reduce the particle size of the frit and to obtain a frit of substantially uniform size.

The resistor material of the present invention may be made by thoroughly mixing together the glass frit, and the tin oxide particles in the appropriate amounts. The mixing is preferably carried out by ball milling the ingredients in water or an organic medium, such as butyl carbitol acetate or a mixture of butyl carbitol acetate and toluol. The mixture is then adjusted to the proper viscosity for the desired manner of applying the resistor material to a substrate by either adding or removing the liquid medium of the mixture. For screen stencil application, the liquid may be evaporated and the mixture blended with a screening vehicle such as manufactured by L. Reusche and Company, Newark, N.J.

Another method of making the resistor material which provides a wider resistance range and better control of temperature coefficient of resistivity, is to first heat treat the tin oxide. The heat treated tin oxide is then mixed with the glass frit to form the resistor material. The tin oxide powder was heat treated in one of the following manners:

Heat treatment 1.

A boat containing the tin oxide is placed on the belt of a continuous furnace. The boat is fired at a peak temperature of 1100° C. over a one hour cycle in a nitrogen atmosphere.

Heat treatment 2.

A boat containing the tin oxide is placed in a tube furnace and forming gas (95% $N_2$ and 5% $H_2$) is introduced into the furnace so that it flows over the boat. The furnace is heated to 525° C. and held at that temperature for a short period of time (up to about 10 minutes). The furnace is then turned off and the boat containing the tin oxide is allowed to cool with the furnace to a temperature of 200° C. or lower. The forming gas atmosphere is maintained until the tin oxide is removed from the furnace.

To make a resistor with the resistor material of the present invention, the resistor material is applied to a uniform thickness on the surface of a substrate. The substrate may be a body of any material which can withstand the firing temperature of the resistor material. The substrate is generally a body of a ceramic, such as glass, porcelain, steatite, barium titanate, alumina, or the like. The resistor material may be applied on the substrate by brushing, dipping, spraying, or screen stencil application. The resistor material is then dried, such as by heating at a low temperature, e.g., 150° C. for 15 minutes. The vehicle mixed with the tin oxide may be burned off by heating at a slightly higher temperature prior to the firing of the resistor. The vehicle burn off has been done in one of the following manners:

Vehicle burn off 1.

Firing at a peak temperature of 350° C. in a continuous belt furnace over a one-half hour cycle in a nitrogen atmosphere.

Vehicle burn off 2.

Firing at a peak temperature of 350° C. in a continuous belt furnace over a one-half hour cycle in an air atmosphere.

Vehicle burn off 3.

Firing at a peak temperature of 400° C. in a continuous belt furnace over a one-half hour cycle in an air atmosphere.

Vehicle burn off 4.

Firing in a box type furnace at a temperature of 400° C. in an air atmosphere for one hour.

The substrate with the resistor material coating is then fired in a conventional furnace at a temperature at which the glass frit becomes molten. The resistor material is fired in an inert atmosphere, such as argon, helium or nitrogen. The resistance and temperature coefficient of resistance varies with the firing temperature used. The firing temperature is selected to provide a desired resistance value with an optimum temperature coefficient of resistance. The minimum firing temperature, however, is determined by the melting characteristics of the glass frit used. When the substrate and the resistor material are cooled, the vitreous enamel hardens to bond the resistance material to the substrate.

As shown in the FIGURE of the drawing, a resultant resistor of the present invention is generally designated as 10. Resistor 10 comprises a ceramic substrate 12 having a layer 14 of the resistor material of the present invention coated and fired thereon. The resistor material layer 14 comprises the glass 16 containing the finely divided particles 18 of the tin oxide. The tin oxide particles 18 are embedded in and dispersed throughout the glass 16.

The following examples are given to illustrate certain preferred details of the invention, it being understood that the details of the examples are not to be taken as in any way limiting the invention thereto.

EXAMPLE I

A resistance material was made by mixing together 50% by volume of tin oxide particles and 50% by volume of particles of a glass of the composition, by weight, of 42% barium oxide (BaO), 20% boron oxide ($B_2O_3$) and 38% silicon dioxide ($SiO_2$). The tin oxide and glass mixture was ball milled in butyl carbitol acetate for one day. The butyl carbitol acetate was then evaporated and the dry mixture was then blended with a Ruesche screening vehicle on a three roll mill.

The resistance material was made into resistors by screening the material onto alumina substrates. The resistance material layers were dried for 15 minutes at 150° C. and subjected to vehicle burn off 1, previously described. Various ones of the resistors were then fired at different peak temperatures between 850° C. and 1150° C. over a one-half hour cycle in a nitrogen atmosphere in a continuous belt furnace. A conductive silver paint was applied to the substrate to form a six square resistor, i.e., a resistor having a length six times its width. The silver paint was cured for one hour at 200° C.

The values of the temperature coefficients of resistance provided in the following Tables are for measurements on the cold side taken at room temperature (25° C.) and at −81° C., except for Tables VIII and IX where cold side measurements were taken at room temperature and at −76° C. Tables I, VII, XIV and XV also provide values of the temperature coefficients of resistance for measurements on the hot side taken at room temperature and at +150° C. From a comparison of values of the temperature coefficients of resistance taken on the cold and hot sides, it is seen that the hot side values are generally more positive than the corresponding cold side values and that the temperature coefficients of resistance characterize the resistors as being extremely stable.

Table I shows the resistance values and temperature coefficients of resistance of the various resistors made in accordance with Example I and fired at different temperatures.

TABLE I

| Peak Firing Temperature °C. | Average Resistance at 25° C. ohms/square | Average Temperature Coefficient of Resistance −81° C. ppm/°C. | Average Temperature Coefficient of Resistance +150° C. ppm/°C. |
|---|---|---|---|
| 850 | 80.6 K. | +60 | — |
| 900 | 61.9 K. | +86 | — |
| 950 | 54.3 K. | +182 | +228 |
| 1000 | 36.3 K. | +66 | +222 |
| 1050 | 18.9 K. | ±65 | ±64 |
| 1100 | 8.24 K. | −63 | +264 |
| 1150 | 5.70 K. | −691 | — |

EXAMPLE II

A resistance material was made in the same manner as in Example I, except that the resistance material contained 20% by volume of tin oxide and 80% by volume of the glass particles. The resistance material was made into resistors in the same manner as described in Example I. Table II shows the resistance values and temperature coefficients of resistance of the resistors which were fired at different temperatures.

TABLE II

| Peak Firing Temperature °C. | Average Resistance at 25° C. ohms/square | Average Temperature Coefficient of Resistance −81° C. ppm/°C. |
|---|---|---|
| 1000 | >18 meg | — |
| 1050 | 7.16 meg | −509 |
| 1100 | 883 K. | −1078 |

EXAMPLE III

A resistance material was made in the same manner as in Example I, except that the resistance material contained 30% by volume of tin oxide and 70% by volume of the glass particles. The resistance material was made into resistors in the same manner as described in Example I. Table III shows the resistance values and temperature coefficients of resistance of the resistors which were fired at different temperatures.

TABLE III

| Peak Firing Temperature °C. | Average Resistance at 25° C. ohms/square | Average Temperature Coefficient of Resistance −81° C. ppm/°C. |
|---|---|---|
| 1000 | >1.6 meg | — |
| 1050 | 932 K. | −229 |
| 1100 | 145 K. | −39 |

EXAMPLE IV

A resistance material was made in the same manner as in Example I, except that the resistance material contained 40% by volume of tin oxide and 60% by volume of the glass particles. The resistance material was made into resistors in the same manner as described in Example I. Table IV shows the resistance values and temperature coefficients of resistance of the resistors which were fired at different temperatures.

TABLE IV

| Peak Firing Temperature °C. | Average Resistance at 25° C. ohms/square | Average Temperature Coefficient of Resistance −81° C. ppm/°C. |
|---|---|---|
| 850 | 5.02 meg | −348 |
| 900 | 3.95 meg | −482 |
| 950 | 2.68 meg | −503 |
| 1000 | 833 K. | −322 |
| 1050 | 209 K. | −282 |
| 1100 | 50.5 K. | −157 |

EXAMPLE V

A resistance material was made in the same manner as in Example I, except that the resistance material contained 60% by volume of tin oxide and 40% by volume of the glass particles. The resistance material was made into resistors in the same manner as described in Example I. Table V shows the resistance values and temperature coefficients of resistance of the resistors which were fired at different temperatures.

TABLE V

| Peak Firing Temperature °C. | Average Resistance at 25° C. ohms/square | Average Temperature Coefficient of Resistance −81° C. ppm/°C. |
|---|---|---|
| 900 | 47.3 K. | −88 |
| 950 | 34.9 K. | −100 |
| 1000 | 17.5 K. | −209 |
| 1050 | 8.06 K. | −270 |
| 1100 | 4.59 K. | −660 |
| 1150 | 7.6 K. | −2043 |

EXAMPLE VI

A resistance material was made in the same manner as in Example I, except that the resistance material contained 70% by volume of tin oxide and 30% by volume of the glass particles. The resistance material was made into resistors in the same manner as described in Example I. Table VI shows the resistance values and temperature coefficients of resistance of the resistors which were fired at different temperatures.

TABLE VI

| Peak Firing Temperature °C. | Average Resistance at 25° C. ohms/square | Average Temperature Coefficient of Resistance −81° C. ppm/°C. |
|---|---|---|
| 900 | 46.5 K. | −837 |
| 950 | 29.8 K. | −971 |
| 1000 | 13.1 K. | −1113 |
| 1050 | 6.56 K. | −1142 |
| 1100 | 4.25 K. | −1804 |
| 1150 | 10.3 K. | −5404 |

EXAMPLE VII

A resistance material was made in the same manner as described in Example I, except that the glass used was of a composition of, by weight, 48% barium oxide (BaO), 8% calcium oxide (CaO), 23% boron oxide ($B_2O_3$) and 21% silicon dioxide ($SiO_2$). The resistance material was made into resistors in the same manner as described in Example I. Table VII shows the resistance values and temperature coefficients of resistance of the resistors fired at various temperatures.

TABLE VII

| Peak Firing Temperature °C. | Average Resistance at 25° C. ohms/square | Average Temperature Coefficient of Resistance | |
|---|---|---|---|
| | | −81° C. ppm/° C. | +150° C. ppm/°C. |
| 850 | 331 K. | −377 | — |
| 900 | 157 K. | −184 | — |
| 950 | 91.7 K. | +39 | +47 |
| 1000 | 42.9 K. | +176 | +221 |
| 1050 | 20.1 K. | +176 | +301 |

EXAMPLE VIII

A resistance material was made in the same manner as described in Example I, except that the glass used was of a composition of, by weight, 46% barium oxide (BaO), 20% boron oxide ($B_2O_3$), 4% aluminum oxide ($Al_2O_3$) and 30% silicon dioxide ($SiO_2$). The resistance material was made into resistors in the same manner as described in Example I. Table VIII shows the resistance values and temperature coefficients of resistance of the resistors fired at various temperatures.

TABLE VIII

| Peak Firing Temperature °C. | Average Resistance at 25° C. ohms/square | Average Temperature Coefficient of Resistance −76° C. ppm/°C. |
|---|---|---|
| 900 | 316 K. | −264 |
| 950 | 209 K. | −226 |
| 1000 | 96 K. | −24 |
| 1050 | 40.9 K. | +58 |

EXAMPLE IX

A resistance material was made in the same manner as described in Example I, except that the glass used was of a composition of, by weight, 31% barium oxide (BaO), 0.7% magnesium oxide (MgO), 9.1% calcium oxide (CaO), 4.5% boron oxide ($B_2O_3$), 6.3% aluminum oxide ($Al_2O_3$), 45.6% silicon dioxide ($SiO_2$), and 2.8% zirconium oxide ($ZrO_2$). The resistance material was made into resistors in the same manner as described in Example I. Table IX shows the resistance values and temperature coefficients of resistance of the resistors fired at various temperatures.

TABLE IX

| Peak Firing Temperature °C. | Average Resistance at 25° C. ohms/square | Average Temperature Coefficient of Resistance −76° C. ppm/°C. |
|---|---|---|
| 900 | 177 K. | −442 |
| 950 | 115 K. | −386 |
| 1000 | 96 K. | −774 |

EXAMPLE X

A resistance material was made in the same manner as described in Example I. The resistance material was made into resistors in the same manner as described in Example I, except that the resistance material was not subjected to a vehicle burn off after it was dried. Table X shows the resistance values and temperature coefficients of resistance of the resistors fired at various temperatures.

TABLE X

| Peak Firing Temperature °C. | Average Resistance at 25° C. ohms/square | Average Temperature Coefficient of Resistance −81° C. ppm/°C. |
|---|---|---|
| 950 | 50.7 K. | +146 |
| 1000 | 32.2 K. | −57 |
| 1050 | 18.2 K. | −91 |

EXAMPLE XI

A resistance material was made in the same manner as described in Example I. The resistance material was made into resistors in the same manner as described in Example I, except that the resistance material was subjected to vehicle burn off 2, previously described. Table XI shows the resistance values and temperature coefficients of resistance of the resistors fired at various temperatures.

TABLE XI

| Peak Firing Temperature °C. | Average Resistance at 25° C. ohms/square | Average Temperature Coefficient of Resistance −81° C. ppm/°C. |
|---|---|---|
| 850 | 54.8 K. | −28 |

TABLE XI-continued

| Peak Firing Temperature °C. | Average Resistance at 25° C. ohms/square | Average Temperature Coefficient of Resistance −81° C. ppm/°C. |
|---|---|---|
| 900 | 41.8 K. | +146 |
| 950 | 31.2 K. | +142 |
| 1000 | 23.5 K. | −24 |
| 1050 | 14.1 K. | −54 |
| 1100 | 7.62 K. | −290 |

EXAMPLE XII

A resistance material was made in the same manner as described in Example I. The resistance material was made into resistors in the same manner as described in Example I, except that the resistance material was subjected to vehicle burn off 3, previously described. Table XII shows the resistance values and temperature coefficients of resistance of the resistors fired at various temperatures.

TABLE XII

| Peak Firing Temperature °C. | Average Resistance at 25° C. ohms/square | Average Temperature Coefficient of Resistance −81° C. ppm/°C. |
|---|---|---|
| 900 | 36 K. | −2032 |
| 950 | 30 K. | −1436 |
| 1000 | 28.5 K. | −2668 |

EXAMPLE XIII

A resistance material was made in the same manner as described in Example I. The resistance material was made into resistors in the same manner as described in Example I, except that the resistance material was subjected to vehicle burn off 4, previously described. Table XIII shows the resistance values and temperature coefficients of resistance of the resistors at various temperatures.

TABLE XIII

| Peak Firing Temperature °C. | Average Resistance at 25° C. ohms/square | Average Temperature Coefficient of Resistance −81° C. ppm/°C. |
|---|---|---|
| 850 | 34.8 K. | −681 |
| 900 | 24.2 K. | −485 |
| 950 | 24.4 K. | −598 |
| 1000 | 24.9 K. | −920 |
| 1050 | 23 K. | −910 |
| 1100 | 24 K. | −2944 |

EXAMPLE XIV

A resistance material was made in the same manner as described in Example I, except that the tin oxide was subjected to heat treatment 1, prior to being mixed with the glass particles. The resistance material was made into resistors in the same manner as described in Example I. Table XIV shows the resistance values and temperature coefficients of resistance of the resistors fired at various temperatures.

TABLE XIV

| Peak Firing Temperature °C. | Average Resistance at 25° C. ohms/square | Average Temperature Coefficient of Resistance | |
|---|---|---|---|
| | | −81° C. ppm/°C. | +150° C. ppm/°C. |
| 850 | 355 K. | −290 | — |
| 900 | 229 K. | −367 | — |
| 950 | 147 K. | −109 | −72 |
| 1000 | 77.5 K. | −15 | +55 |
| 1050 | 34.5 K. | ±27 | +49 |
| 1100 | 12.1 K. | +64 | — |

EXAMPLE XV

A resistance material was made in the same manner as described in Example I, except that the tin oxide was subjected to heat treatment 2 prior to being mixed with the glass particles. The resistance material was made into resistors in the same manner as described in Example I. Table XV shows the resistance values and temperature coefficients of resistance of the resistors fired at various temperatures.

TABLE XV

| Peak Firing Temperature °C. | Average Resistance at 25° C. ohms/square | Average Temperature Coefficient of Resistance | |
|---|---|---|---|
| | | −81° C. ppm/°C. | +150° C. ppm/°C. |
| 850 | 776 K. | −307 | — |
| 900 | 441 K. | −273 | — |
| 950 | 248 K. | −138 | −181 |
| 1000 | 101 K. | −67 | −100 |
| 1050 | 34.3 K. | +40 | +17 |
| 1100 | 8.28 K. | +194 | +228 |
| 1150 | 2.75 K. | +236 | +451 |

From the above examples there can be seen the effects, on the electrical characteristics of the resistor of the present invention, of variations in the composition of the resistance material and the method of making the resistance material. Examples I, II, III, IV, V and VI show the effects of varying the ratio of the tin oxide and the glass frit. Examples I, VII, VIII and IX show the effects of varying the composition of the glass frit. Examples I, X, XI, XII and XIII show the effects of varying the vehicle burn off conditions. Examples I, XIV and XV show the effects of heat treating the tin oxide. All of the Examples show the effect of varying the firing temperature of the resistors. Thus, there is provided by the present invention a vitreous enamel resistor using tin oxide as the conductive phase which is relatively stable with regard to temperature and is made of materials which are relatively inexpensive.

The resistors of the invention were terminated with the commercially available nickel glaze CERMALLOY 7128 and subjected to temperature cycling tests. During the tests the temperature was cycled five times between −55° C. and +85° C. The resulting changes in resistance were small, being less than 0.05%. The above results are very favorable when compared to the poor stability attained by Mochel and described in his U.S. Pat. No. 2,564,707 when his pyrolytically deposited tin oxide resistors were subjected to testing by temperature cycling.

Resistor glazes based on noble metals are typically terminated with expensive precious metal materials such as platinum, paladium, and gold. This resistor, however, is compatible with terminations made of non-noble metals such as copper and nickel. This has the advantage of both reducing the cost of the resistor, and providing a more solderable termination.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

What is claimed is:

1. A vitreous enamel resistor material adapted to be applied to and fired on a substrate to form an electrical resistor with a relatively low temperature coefficient of resistance consisting essentially of a mixture of tin oxide particles and a glass frit, said glass frit having a softening point below the melting point of the tin oxide particles, said mixture being fired in an inert atmosphere to a temperature between approximately 850° C. and 1150° C., said tin oxide being present in the amount of 20% to 70% by volume.

2. A vitreous enamel resistor material in accordance with claim 1 in which the glass frit is present in the amount of 40% to 60% by volume.

3. A vitreous enamel resistor material in accordance with claim 1 in which said tin oxide particles are heat treated prior to said tin oxide particles being mixed with said glass frit.

4. A vitreous enamel resistor material in accordance with claim 1 in which the glass frit is a borosilicate glass frit.

5. A vitreous enamel resistor material in accordance with claim 4 in which the glass frit is an alkaline earth borosilicate glass frit.

6. A method of making electrical resistors providing selected resistivities within a wide range and with controlled temperature coefficients of resistance comprising the steps of mixing together in selected amounts a glass frit and conductive particles consisting essentially of tin oxide, the glass frit being present in the amount of 30% to 80% by volume, applying said mixture to a surface of a substrate, firing said coated substrate in an inert atmosphere to a selected temperature between approximately 850° C. and 1150° C. at which the glass softens but below the point at which the tin oxide melts, and cooling the coated substrate to form a layer of glass bonded to the substrate and having conductive particles of tin oxide embedded in and dispersed throughout the glass.

7. The method in accordance with claim 6 in which the glass frit and tin oxide are mixed with a vehicle suitable for applying the mixture to the substrate, and after the mixture is applied to the substrate it is dried.

8. The method in accordance with claim 7 in which prior to firing the coated substrate it is heated to burn off the vehicle in the mixture.

9. The method in accordance with claim 8 in which the coated substrate is heated to 350° C. in air to burn off the vehicle.

10. The method in accordance with claim 8 in which the coated substrate is heated to 350° C. in a nitrogen atmosphere to burn off the vehicle.

11. The method in accordance with claim 8 in which the coated substrate is heated to 400° C. in air to burn off the vehicle.

12. The method in accordance with claim 6 in which prior to mixing the tin oxide with the glass frit the tin oxide is heat treated subsequent to its initial formation.

13. An electrical resistor of the vitreous enamel type characterized by having a resistivity within a wide range and a relatively low temperature coefficient of resistance made by mixing together in selected amounts a glass frit and conductive particles consisting essentially of tin oxide, the glass frit being present in the amount of 30% to 80% by volume, applying said mixture to a surface of a substrate, firing said coated substrate in an inert atmosphere to a temperature between approximately 850° C. and 1150° C. at which the glass softens and below the point at which the tin oxide melts, and cooling the coated substrate to form a resistive layer of glass bonded to the substrate and having conductive particles of tin oxide embedded in and dispersed throughout the glass.

14. An electrical resistor made in accordance with claim 13 in which prior to applying said mixture the glass frit and tin oxide are mixed with a vehicle suitable for applying the mixture to the substrate, and after the mixture is applied it is dried.

15. An electrical resistor made in accordance with claim 14 in which prior to firing the coated substrate it is heated to burn off the vehicle in the mixture.

16. An electrical resistor made in accordance with claim 15 in which the coated substrate is heated to 350° C. in air to burn off the vehicle.

17. An electrical resistor made in accordance with claim 15 in which the coated substrate is heated to 350° C. in a nitrogen atmosphere to burn off the vehicle.

18. An electrical resistor made in accordance with claim 15 in which the coated substrate is heated to 400° C. in air to burn off the vehicle.

19. An electrical resistor made in accordance with claim 13 in which prior to mixing the tin oxide with the glass frit the tin oxide is heat treated after being initially formed.

20. A vitreous enamel resistor material in accordance with claim 3 in which the tin oxide is heat treated in a furnace having a nitrogen atmosphere and a peak temperature of 1100° C. for about one hour.

21. A vitreous enamel resistor material in accordance with claim 3 in which the tin oxide is heat treated by heating in an atmosphere of forming gas at about 525° C. for about 10 minutes and then allowed to cool in the forming gas atmosphere.

* * * * *